United States Patent [19]

Taylor et al.

[11] 3,894,068

[45] July 8, 1975

[54] MANUFACTURE OF BASIC LEAD STYPHNATE

[76] Inventors: George William Charles Taylor, 7 The Cobbins, Waltham Abbey, Essex; Arwyn Theophilus Thomas, 66 Gillmans Rd., Orpington, Kent, both of England

[22] Filed: Jan. 15, 1963

[21] Appl. No.: 252,271

[30] Foreign Application Priority Data
Jan. 15, 1962 United Kingdom.................. 1478/62

[52] U.S. Cl............................... 260/435 A; 149/24
[51] Int. Cl. ................................................ C07f 7/24
[58] Field of Search ............. 149/105, 106, 111, 24, 149/25, 26, 27, 28; 260/435 A, 435

[56] References Cited
UNITED STATES PATENTS
2,441,248   5/1948   Morris et al. ...................... 149/25 X
3,803,190   4/1974   Taylor et al. ...................... 149/24 X

*Primary Examiner*—Leland A. Sebastian
*Attorney, Agent, or Firm*—Robert P. Gibson; Nathan Edelberg

EXEMPLARY CLAIM

1. A process for the manufacture of basic lead styphnate in the beta polymorphic form which comprises forming an aqueous solution of alkali metal styphnate a compound selected from the group consisting of lead nitrate and lead acetate which contains 2-nitroresorcinol, reacting the solution so formed with an aqueous solution of a compound selected from the group consisting of lead nitrate and lead acetate whereby a precipitate of beta polymorphic basic lead styphnate is formed, and separating out the beta polymorphic basic lead styphnate from the reaction mixture.

4 Claims, No Drawings

MANUFACTURE OF BASIC LEAD STYPHNATE

The invention relates to improvements in the manufacture of the monobasic lead salt of trinitroresorcinol, commonly termed basic lead styphnate, which may be used as a primary explosive or as a constituent of explosive priming and delay compositions.

Basic lead styphnate, which may be represented by the formula $C_6H(NO_2)_3O_2Pb \cdot Pb(OH)_2$, is superior to the commonly used normal salt in that the former beings to decompose only above 200°C as compared with a decomposition temperature of 130°C for the latter. Furthermore, the reaction of the basic salt in the presence of moisture is almost neutral as compared with the definite acidity of the normal salt.

Despite these advantages, basic lead styphnate has been little used commercially. This is due mainly to the complex crystallising properties associated with its existence in at least three polymorphic modifications. Thus the compound usually assumes crystal habits which give it poor flowing and poor mixing characteristics and consequently make it unsatisfactory for technical use. In addition, such a product presents handling hazards because of its excessive sensitiveness to ignition by electrostatic sparks of low energy.

Although well-formed crystals of the beta polymorph, or so-called red variety have been prepared experimentally, no process for preparing basic lead styphnate in a satisfactory form on a commercial scale has been described.

The invention provides an improved process whereby basic lead styphnate may be produced on a commercial scale in the beta polymorphic form substantially uncontaminated by other, in particular the yellow, modifications. The improved process provides a range of useful products with pre-determined properties which can be prepared with excellent reproducibility on a technical scale. Furthermore, they include products formed as free-flowing granules which may be readily handled and whose sensitiveness to ignition by an electrostatic spark is reduced and also products especially applicable as pastes to fuseheads.

An improved process for the manufacture of basic lead styphnate according to the invention by which the beta polymorph is produced, involves the intermixing of an aqueous solution of a soluble styphnate, such as an alkali metal styphnate, containing 2-nitroresorcinol with an aqueous solution of a soluble lead salt. 2-Nitroresorcinol is added to an aqueous solution of the soluble styphnate preferably in a proportion from 0.1 to 5 per cent by weight calculated on a styphnic acid content. This mixed solution is reacted slowly with an aqueous solution of a soluble lead salt at a temperature preferably in the range 50° to 90°C. After washing and drying, the resulting precipitate of beta polymorphic basic lead styphnate is isolated by conventional methods. A product in the form of free-flowing granules, having bulk density of from 0.8 to 2.0 g./ml depending upon the amount of 2-nitroresorcinol employed, is obtained.

The addition of ammonia to the reaction mixture in excess of that required to form ammonium styphnate aids the formation of crystals of beta polymorphic basic lead styphnate of a desired size.

Particular examples of the improved manufacture of basic lead styphnate in accordance with the invention are as follows:-

EXAMPLE 1.

A solution of sodium styphnate/sodium nitroresorcinate is prepared by adding in small quantities 241.8 g. (2.28 mole) anhydrous sodium carbonate to a stirred dispersion of 552 g. (2.25 mol.) styphnic acid (dry weight) and 12 g. 2-nitroresorcinol in 14 litres of water warmed to 40°C. When evolution of carbon dioxide is finished, the solution is filtered and is made up to 16 litres by the addition of water; this solution is stable and can be stored for up to 6 months before use. 2 litres (4.2 mole) sodium hydroxide solution (84g./l) are mixed with the 16 litres of diluted filtrate. The resulting solution (18 litres) is added over a period of 90 mins. to a stirred solution of 11.92 litres (9.0 mol.) lead nitrate solution (250 g./l.), the temperature being maintained at 70°C during the precipitation. A further 5 to 10 mins. stirring after addition is given. The product settles quickly when the stirring is discontinued and the supernatant liquor is easily decanted. The product is washed in the precipitating pan by decantation.

The product is easily transferred into a gutta-percha drying pot, washed with methylated spirits and dried by passage of dry air. The yield of product obtained is 1.59 kg. (3.5 lbs) and has a bulk density of 1.2 g./ml.

When dry, the product is in the form of free-flowing reddish brown crystalline granules which sieve readily and handle without difficulty. The ignition temperature of the material is 250–257°C and it is suitable as a fast burning delay composition and as the explosive ingredient of priming compositions.

EXAMPLE 2.

10.0 litres of a ammoniacol lead acetate solution containing 2,870 g. (7.56 mole) lead acetate and 25.5 g. (1.50 mole) ammonia are added over a period of 45 mins. to a stirred solution of 18 litres ammonium styphnate containing 882 g. (3.6 mole) styphnic acid, 18 g. 2-nitroresorcinol, and 219 g. (12.9 mole) ammonia. The precipitation temperature is maintained at 75°C and stirring is continued for 5 mins. after addition. The product settles readily when the stirring is discontinued and the supernatant liquor is decanted and the product is washed several times in the precipitating pan. The filtered product is washed with methylated spirits in the drying pot and dried by passage of dry air. The yield of product obtained is 1.91 Kg. (4.5 lbs.) and has a bulk density of 1.30 g./ml.

When dry, the product is in the form of oval-shaped, yellowish-brown, crystals having an ignition temperature of 248°–250°C. The material pastes well on to fusehead wires giving sensitive fuseheads of high thermal stability.

It will be noted that ammonia is included in both the lead acetate solution and the ammonium styphnate solution as it has been found that the presence of ammonia in both of the two reacting solutions gives products having a reduced electrostatic sensitivity.

We claim:

1. A process for the manufacture of basic lead styphnate in the beta polymorphic form which comprises forming an aqueous solution of alkali metal styphnate which contains 2-nitroresorcinol, reacting the solution so formed with an aqueous solution of a compound selected from the group consisting of lead nitrate and lead acetate whereby a precipitate of beta polymorphic basic lead styphnate is formed, and separating out the beta polymorphic basic lead styphnate from the reaction mixture.

2. A process according to claim 1 wherein the reaction is carried out at 50°–70°C.

3. A process according to claim 1 wherein the 2-nitroresorcinol is present in the said solution of alkali metal styphnate is between 0.1 and 5 per cent by weight based on the a compound selected from the group consisting of lead nitrate and lead acetate content.

4. A process according to claim 1 wherein ammonia is present in the reaction mixture in an amount exceeding that required to form ammonium styphnate.

* * * * *